United States Patent
Ray

(10) Patent No.: US 7,306,068 B1
(45) Date of Patent: Dec. 11, 2007

(54) DISABLE BELT FOR AN ELECTRICALLY DRIVEN TRANSPORTER OPERATED BY A HANDICAPPED PERSON

(76) Inventor: Bret P. Ray, 344 Juniper Ln., Albany, OR (US) 97321-1430

( * ) Notice: Subject to any disclaimer, the term of this patent is extended or adjusted under 35 U.S.C. 154(b) by 529 days.

(21) Appl. No.: 10/885,461

(22) Filed: Jul. 7, 2004

(51) Int. Cl.
*B60L 3/00* (2006.01)

(52) U.S. Cl. ............................ 180/271; 180/270
(58) Field of Classification Search ........ 280/270–273, 280/281, 268, 801.1; 297/468
See application file for complete search history.

(56) References Cited

U.S. PATENT DOCUMENTS

| | | | | |
|---|---|---|---|---|
| 3,133,277 A | * | 5/1964 | Hood | 180/270 |
| 3,340,523 A | * | 9/1967 | Whitman | 340/521 |
| 3,624,601 A | * | 11/1971 | Routzahn et al. | 180/270 |
| 4,209,075 A | * | 6/1980 | Messina | 180/268 |
| 4,347,910 A | * | 9/1982 | Deguara | 180/268 |
| 4,415,049 A | | 11/1983 | Wereb | |
| 4,489,256 A | | 12/1984 | Brodsky | |
| 4,537,274 A | * | 8/1985 | Parquet | 180/270 |
| 4,805,711 A | | 2/1989 | Lautzenhiser | |
| 4,871,044 A | * | 10/1989 | Strosser et al. | 180/273 |
| 4,934,723 A | * | 6/1990 | Dysarz | 280/250.1 |
| 4,978,899 A | | 12/1990 | Lautzenhiser et al. | |
| 6,072,292 A | | 6/2000 | Uchiyama et al. | |
| 6,073,951 A | * | 6/2000 | Jindra et al. | 280/304.1 |
| 2005/0189803 A1 | * | 9/2005 | Kasten | 297/219.1 |

* cited by examiner

*Primary Examiner*—Paul N. Dickson
*Assistant Examiner*—Drew J. Brown
(74) *Attorney, Agent, or Firm*—Norman B. Rainer

(57) ABSTRACT

A fail-safe breakaway belt is provided for installation onto a single occupant transporter having a seat portion laterally bounded by arm rests, an electrical system that drives the transporter, and a joystick associated with one arm rest for controlling the electrical system. The belt includes two oppositely disposed elongated members, each having a proximal extremity secured to the transporter below an arm rest, and extending to a distal extremity. Electrical conductor wires in series connection with the electrical system are incorporated into the elongated members. When the distal extremities are separated, the transporter is rendered inoperable. When the distal extremities are connected across the lap of the occupant, full functionality is restored to the transporter.

8 Claims, 2 Drawing Sheets

DISABLE BELT FOR AN ELECTRICALLY DRIVEN TRANSPORTER OPERATED BY A HANDICAPPED PERSON

BACKGROUND OF THE INVENTION

1. Field of the Invention

This invention relates to electrically driven single occupant transporters such as wheelchairs and scooters used by handicapped persons, and more particularly concerns apparatus for achieving safe stopping of such transporters.

2. Description of the Prior Art

Electrically driven transporters such as wheelchairs and scooters are in widespread use for providing independent mobility to a single seated handicapped person. Control of the movement of such transporters by the occupant is generally achieved by way of manual manipulation of a joystick lever positioned within or adjacent an arm rest of the transporter, particularly in wheelchairs. Appropriate movement of the joystick produces forward, rearward, or turning motions, and controls the speed of the wheelchair in the chosen direction. Stopping or braking of the wheelchair is generally produced by pressing a button or moving the joystick to a centered "OFF" position.

U.S. Pat. Nos. 4,415,049; 4,489,256; 4,805,711; 4,978,899 and 6,072,292 relate to the securement of reasonably smooth braking of wheelchairs based upon manipulation of the joystick in conjunction with electrical features of motors that drive the wheels. However, all of said braking systems assume that the occupant is in complete and competent control of the operation of the wheelchair, and do not contemplate emergency stopping situations or inadequate attentiveness to prevent accidents.

Most persons using electrically driven wheelchairs are elderly or feeble, or may have diminished alertness. When they get out of any chair, they have to shuffle their feet around to find their balance point. In doing so, they generally place their hand on the arm of the chair for support. Getting out of a wheelchair is even more difficult because it is less stable than a stationary chair. If the joystick is inadvertently bumped during this process, the chair could push or pull the person, which might very likely cause an injury. Although some electric wheelchairs have been equipped with a disable switch located adjacent the joystick, wheelchair occupants often forget to use this.

It would therefore be desirable to achieve automatic immobilization of the wheelchair when the occupant arises from a seated position in the chair. "Dead man's" switches earlier proposed to achieve this goal have employed weight sensors within the seat of the chair. However, when the wheelchair travels rapidly over a bump, the transient release of downward force upon the seat may trigger a dangerously abrupt braking action.

It is accordingly a primary object of the present invention to provide apparatus for automatically disabling and immobilizing an electric transporter when the occupant rises from a seated position in the transporter.

It is another object of this invention to provide apparatus as in the foregoing object which enable the transporter occupant to easily restore normal operation of the transporter when re-seated therein.

It is a further object of the present invention to provide apparatus of the aforesaid nature which can be inexpensively installed onto existing electric transporters.

These objects and other objects and advantages of the invention will be apparent from the following description.

SUMMARY OF THE INVENTION

The above and other beneficial objects and advantages are accomplished in accordance with the present invention by an apparatus installable onto a single occupant transporter having a seat portion laterally bounded by arm rests, an electrical system that drives said transporter, and a joystick associated with one arm rest for controlling said electrical system, said apparatus comprising a belt comprised of two oppositely disposed elongated members, each having a proximal extremity secured to said wheelchair below an associated arm rest and extending to a distal extremity, at least one of said elongated members containing an electrical conductor in series connection with said electrical system, said distal extremities adapted to slideably interconnect, causing said conductors to complete an electrical circuit that permits operation of said wheelchair, and disconnect, causing said wheelchair to become inoperative.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
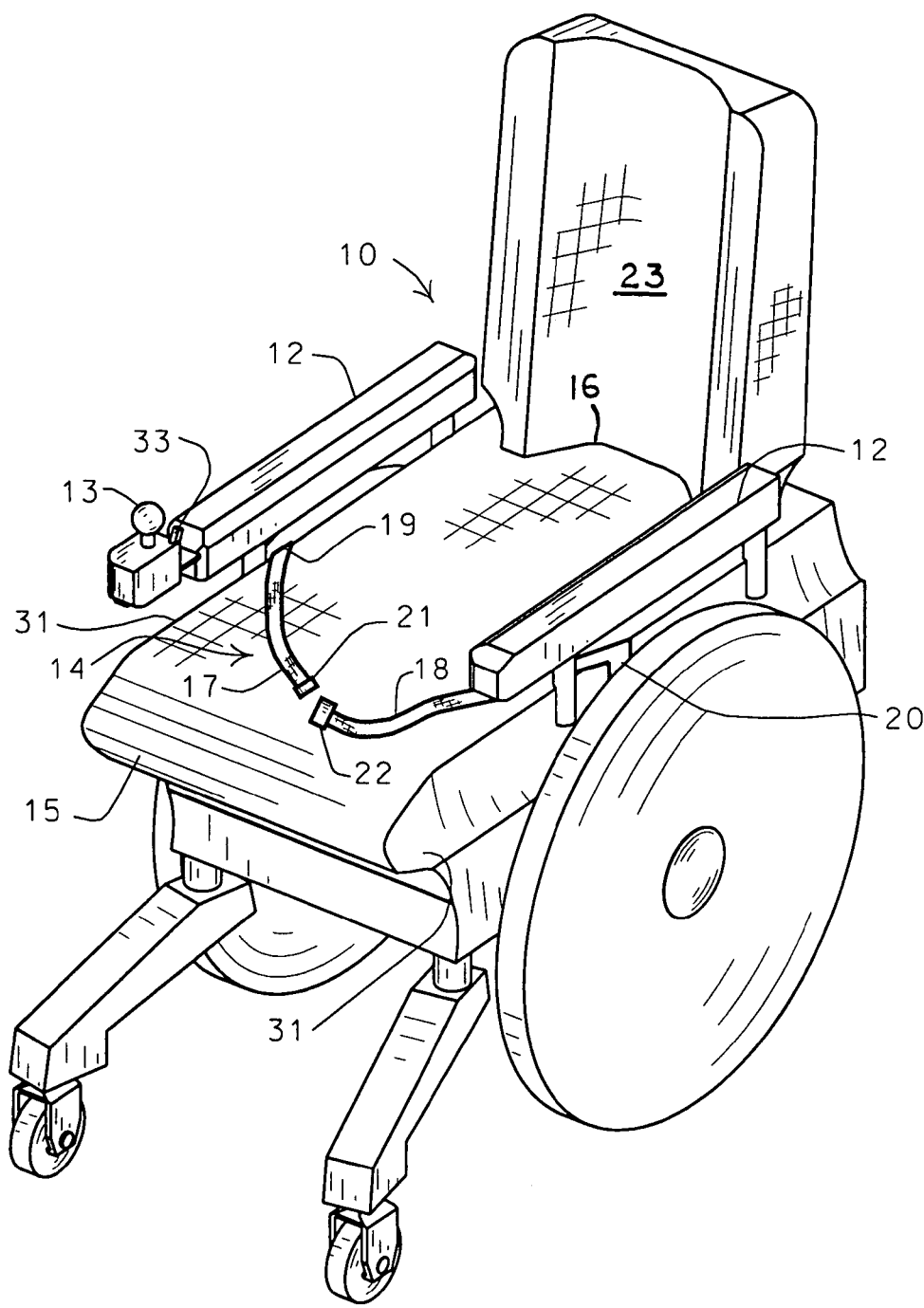
FIG. 1 is a top perspective view of a conventional electric wheelchair equipped with an immobilizing apparatus of the present invention, shown in a disconnected state which immobilizes the wheelchair.
Figure 2:
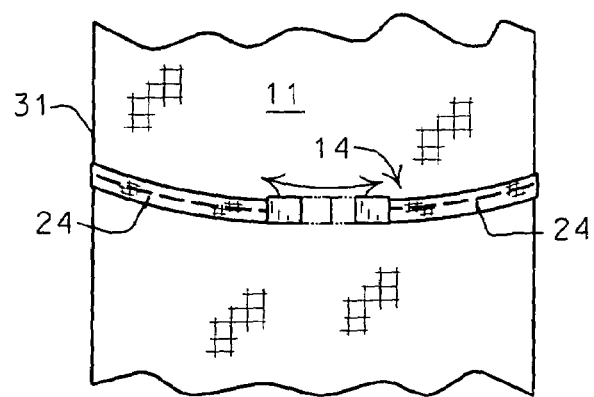
FIG. 2 is an enlarged fragmentary view of the immobilizing apparatus shown in FIG. 1.
Figure 3:
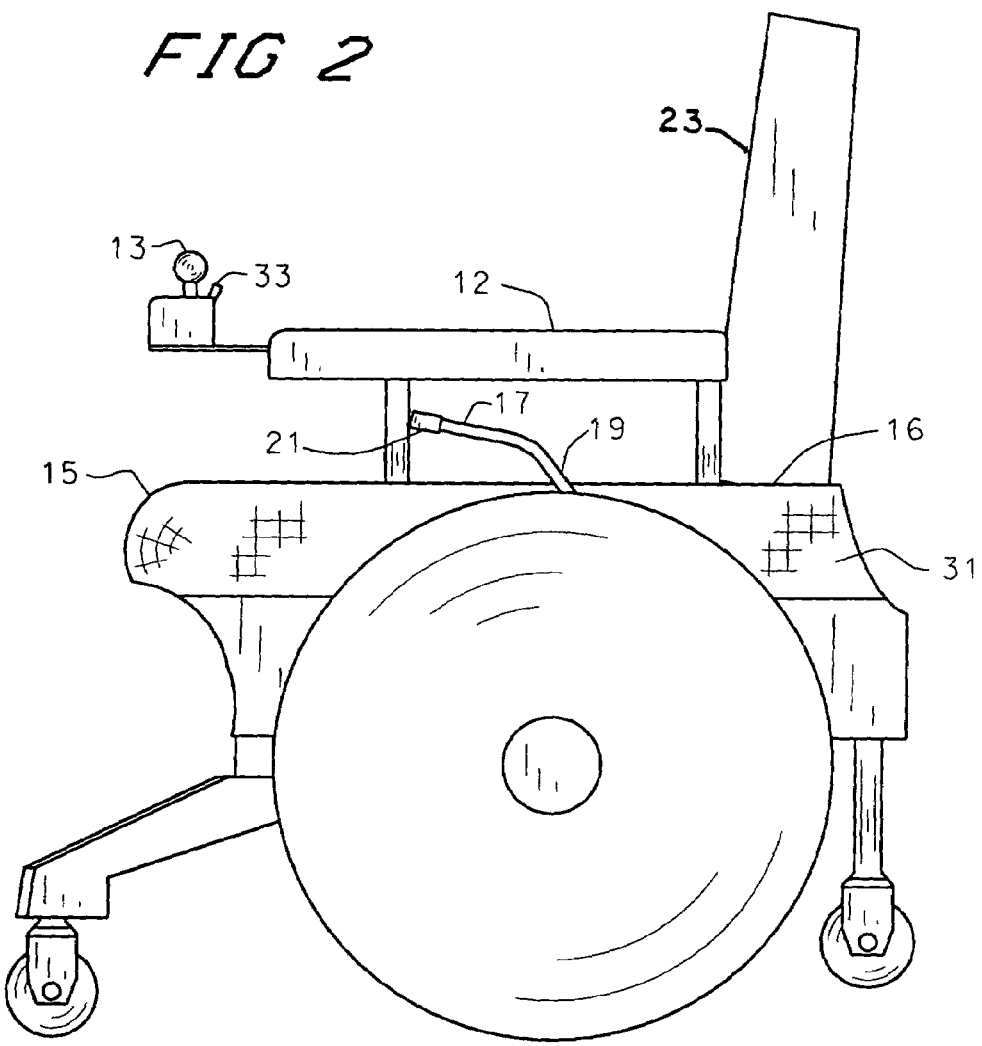
FIG. 3 is a side view of the immobilizing apparatus and wheelchair of FIG. 1.

Referring now to FIGS. 1 and 2, an electrical wheelchair 10 is shown equipped with seat portion 11, laterally opposed arm rests 12, and joystick 13 which controls an electrical system that drives the wheelchair. Seat portion 11 extends between front surface 15, rear edge 16 which abuts against upwardly directed back support 23, and lateral side edges 31 located below said arm rests.

An embodiment of the immobilizing apparatus of the present invention, in the form of breakaway belt 14, is shown disposed upon seat portion 11 adjacent front surface 15 and extending between side edges 31 of said seat portion. Belt 14 is comprised of two oppositely disposed elongated members 17 and 18, each having a proximal extremity 19 and 20, respectively, secured to the wheelchair below an associated arm rest, and distal extremities 21 and 22, respectively.

Said elongated members may be of plastic or fabric construction, having a width between about ½ inch and 2 inches, and being of sufficiently compliant construction to minimize discomfort when worn across the lap of the wheelchair occupant. Said elongated members should, however, have sufficient bulk, particularly at said distal extremities, as to cause discomfort to the underside of the occupant's thighs when the occupant chooses to sit upon the elongated member components of the belt.

In the embodiment shown in FIG. 2, each of said elongated members contains an electrical conductor 24 which is in series connection with an on/off switch 33 associated with said joystick. Said on/off switch is designed to make the wheelchair safe when in the off position. Said distal extremities are adapted to slideably interconnect such as by way of male and female fittings. Such interconnection causes said conductors to complete an electrical circuit that permits normal operation of the on/off switch, and thus the wheelchair. When said distal extremities are disconnected, the wheelchair is inoperative except for any fail-safe braking mechanism which might be a conventional feature of the wheelchair.

In operation, the wheelchair user, upon entering the wheelchair, will interconnect said distal extremities so as to form an assembled belt which will rest upon his or her lap. Such interconnected state is shown in the broken lines in FIG. 2. If, in the course of operation of the wheelchair, the user willfully chooses to stand upright to exit the wheelchair, whether or not the on/off switch has been moved to its "off" position, said distal extremities will separate, thereby deactivating the wheelchair with respect to any electrically driven forward motion. A similar result is achieved if the wheelchair occupant is caused to lurch forwardly. The thickness of the belt components, particularly the distal extremities, are preferably between 0.25 and 1.0 inch, so as to cause discomfort when the user is seated thereupon, thereby motivating proper use of the belt. Said proximal extremities are preferably anchored to the wheelchair at laterally opposed sites located between 30% and 40% of the distance going from front surface 15 toward said rear edge. Such placement has been found critically important in optimizing the forward and upward force exerted by the occupant to cause disconnection of said distal extremities.

The amount of current that is caused to pass through the belt is sufficiently small as to avoid any potential shock hazard to the user. In an alternative embodiment, instead of employing a conductor in each elongated member, two parallel conductors may be contained in just one of the elongated members, preferably that member which is equipped with a female fitting. In such embodiment, the function of the distal extremity of the opposite elongated member is to bridge said parallel conductors to create a completed electrical circuit.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In a wheelchair driven by an electrical system and operated by a seated handicapped occupant, and having a seat portion bounded in part by a front surface and a rear edge, and paired arm rests laterally embracing said seat portion, the wheelchair comprising a safety apparatus that automatically stops driven motion of the wheelchair when the occupant rises, said apparatus comprising a belt having two oppositely disposed elongated members, each having a proximal extremity secured to said wheelchair below an associated arm rest and extending to a distal extremity, at least one of said elongated members containing an electrical conductor in series connection with said electrical system, said distal extremities adapted to slideably interconnect so as to form an assembled belt can rest upon the lap of the occupant and completes an electrical circuit which permits operation of said wheelchair.

2. The safety apparatus of claim 1 wherein each elongated member contains one electrical conductor wire.

3. The safety apparatus of claim 1 wherein one of said elongated members contains two parallel electrical conductor wires.

4. The safety apparatus of claim 1 wherein said elongated members have widths between ¼ and 2 inches, and are of sufficiently compliant construction to minimize discomfort when worn across the lap of said occupant.

5. The apparatus of claim 4 wherein said elongated members have sufficient bulk as to cause discomfort to the underside of the occupant's thighs when the occupant chooses to sit upon said elongated members.

6. The apparatus of claim 5 wherein said distal extremities have slideably interactive male and female fittings.

7. The invention described in claim 1 wherein the proximal extremities of said elongated members are secured to said wheelchair at laterally opposed sites located between 30% and 40% of the distance going from said front surface toward said rear edge.

8. The invention of claim 1 wherein said wheelchair is equipped with a joystick having an on/off switch, and the conductors of said elongated members are electrically interactive with said on/off switch.

* * * * *